United States Patent
Wang et al.

(10) Patent No.: US 10,133,447 B2
(45) Date of Patent: Nov. 20, 2018

(54) MERGED EXPERIENCE OF READING AND EDITING WITH SEAMLESS TRANSITION

(71) Applicant: Microsoft Corporation, Redmond, WA (US)

(72) Inventors: Shen Wang, San Jose, CA (US); Alexandre Gueniot, Mountain View, CA (US); Cheng-Kai Chen, Fremont, CA (US); Jonathan Ko, Santa Clara, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 261 days.

(21) Appl. No.: 14/518,783

(22) Filed: Oct. 20, 2014

(65) Prior Publication Data
US 2015/0378525 A1 Dec. 31, 2015

Related U.S. Application Data

(60) Provisional application No. 62/018,312, filed on Jun. 27, 2014.

(51) Int. Cl.
*G06F 3/00* (2006.01)
*G06F 3/0482* (2013.01)
(Continued)

(52) U.S. Cl.
CPC .......... *G06F 3/0482* (2013.01); *G06F 3/0488* (2013.01); *G06F 3/04842* (2013.01); *G06F 3/04855* (2013.01); *G06F 3/04883* (2013.01)

(58) Field of Classification Search
CPC .... G06F 3/0481; G06F 3/0486; G06F 3/0482; G06F 3/04847; G06F 3/04817;
(Continued)

(56) References Cited

U.S. PATENT DOCUMENTS

| 8,686,962 B2 | 4/2014 | Christie |
| 2012/0005578 A1 | 1/2012 | Hawkins |

(Continued)

FOREIGN PATENT DOCUMENTS

| WO | 2012166976 A2 | 12/2012 |
| WO | WO 2012/166736 | 12/2012 |

OTHER PUBLICATIONS

"Editing and presenting slideshows", Published on: Mar. 31, 2013, Available at: http://docs.blackberry.com/en/smartphone_users/deliverables/47561/cfl13331336627132.jsp#cfl13331336627132, 1 page.

(Continued)

*Primary Examiner* — Jeffrey A Gaffin
*Assistant Examiner* — Ayesha Huertas Torres
(74) *Attorney, Agent, or Firm* — Merchant & Gould

(57) ABSTRACT

Aspects of the present disclosure provide for determining user input of a presentation. Specifically, aspects disclosed herein provide differentiating between interacting with selectable objects within a slide and scrolling between slides, editing a selectable object within a slide, scrolling between slides, viewing off slide content, zooming out from a slide view, and zooming in to a slide view.

24 Claims, 13 Drawing Sheets

(51) Int. Cl.
*G06F 3/0484* (2013.01)
*G06F 3/0488* (2013.01)
*G06F 3/0485* (2013.01)

(58) Field of Classification Search
CPC ........... G06F 3/048; G06F 2203/04806; G06F 3/04855; G06F 3/04883; G06F 17/246
See application file for complete search history.

(56) References Cited

U.S. PATENT DOCUMENTS

| | | | |
|---|---|---|---|
| 2013/0076642 A1 | 3/2013 | Rampson et al. | |
| 2013/0205201 A1 | 8/2013 | Tsai et al. | |
| 2014/0075373 A1* | 3/2014 | Jitkoff | G06F 3/0481 715/784 |

OTHER PUBLICATIONS

Wood, James T, "Can I Update a PowerPoint Presentation While it Is Actively Running?", Published on: Jan. 18, 2012, Available at: http://www.ehow.com/info_10036359_can-update-powerpoint-presentation-actively-running.html, 3 pgs.

"Typing on a Slide during the Presentation—Office 2007", Published on: Mar. 24, 2008, Available at: http://www.internet4classrooms.com/ppt_type_on_slide_07.htm, 3 pgs.

"Edit and format presentations on Android", Retrieved on: Jun. 27, 2014, Available at: https://support.google.com/docs/answer/6042774, 5 pgs.

PCT International Search Report and Written Opinion in International Application PCT/US2015/037562, mailed Sep. 17, 2015, 10 pgs.

PCT Second Written Opinion in PCT/US2015/037562, mailed Jun. 6, 2016, 6 pages.

Andre Meyer-Vitali, "Operations on Slides in Microsoft PowerPoint 2010", May 20, 2016, 3 pages.

Nancy Muir, "Microsoft PowerPoint 2010 Plain and Sample" May 15, 2010, 3 pages.

"International Preliminary Report on Patentability Issued in PCT Application No. PCT/US2015/037562", dated Aug. 29, 2016, 6 Pages.

\* cited by examiner

MERGED EXPERIENCE OF READING AND EDITING WITH SEAMLESS TRANSITION

CROSS-REFERENCE TO RELATED APPLICATION

This application claims priority to and the benefit of U.S. Provisional Application Ser. No. 62/018,312, filed Jun. 27, 2014, the disclosure of which is hereby incorporated by reference herein in its entirety.

BACKGROUND

Computing devices are often use applications to view and create content. Presentation applications generally include different types of modes. For example, a presentation application may have an edit mode and a read mode. Interpretation of input depends upon the particular mode the application is in. This is particularly true when a presentation application is executing on a device with a touch interface. For example, in a read mode a swipe of a finger may indicate that a user wishes to navigate to another slide or the swipe may indicate that the user wishes to move an object within the current slide. When in edit mode, a similar swipe may be interpreted as moving an object within current slide.

Switching between read and edit mode, however, can be cumbersome. Requiring a user to toggle between read and edit modes slows down edit time and can result in a diminished user experience.

It is with respect to these and other general considerations that aspects of the present technology have been disclosed. Also, although relatively specific problems have been discussed, it should be understood that the aspects should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Aspects of the present disclosure provide for determining user input of a presentation. Specifically, aspects disclosed herein provide differentiating between interacting with selectable objects within a slide and scrolling between slides, editing a selectable object within a slide, scrolling between slides, viewing off slide content, zooming out from a slide view, and zooming in to a slide view, etc.

Aspects may be implemented as a computer process, a computing system or as an article of manufacture such as a computer program product or computer readable media. The computer program product may be computer storage media readable by a computer system and encoding a computer program of instructions for executing a computer process.

BRIEF DESCRIPTION OF THE DRAWINGS

Non-limiting and non-exhaustive aspects are described with reference to the following FIGS. in which.

DETAILED DESCRIPTION

Figure 1:
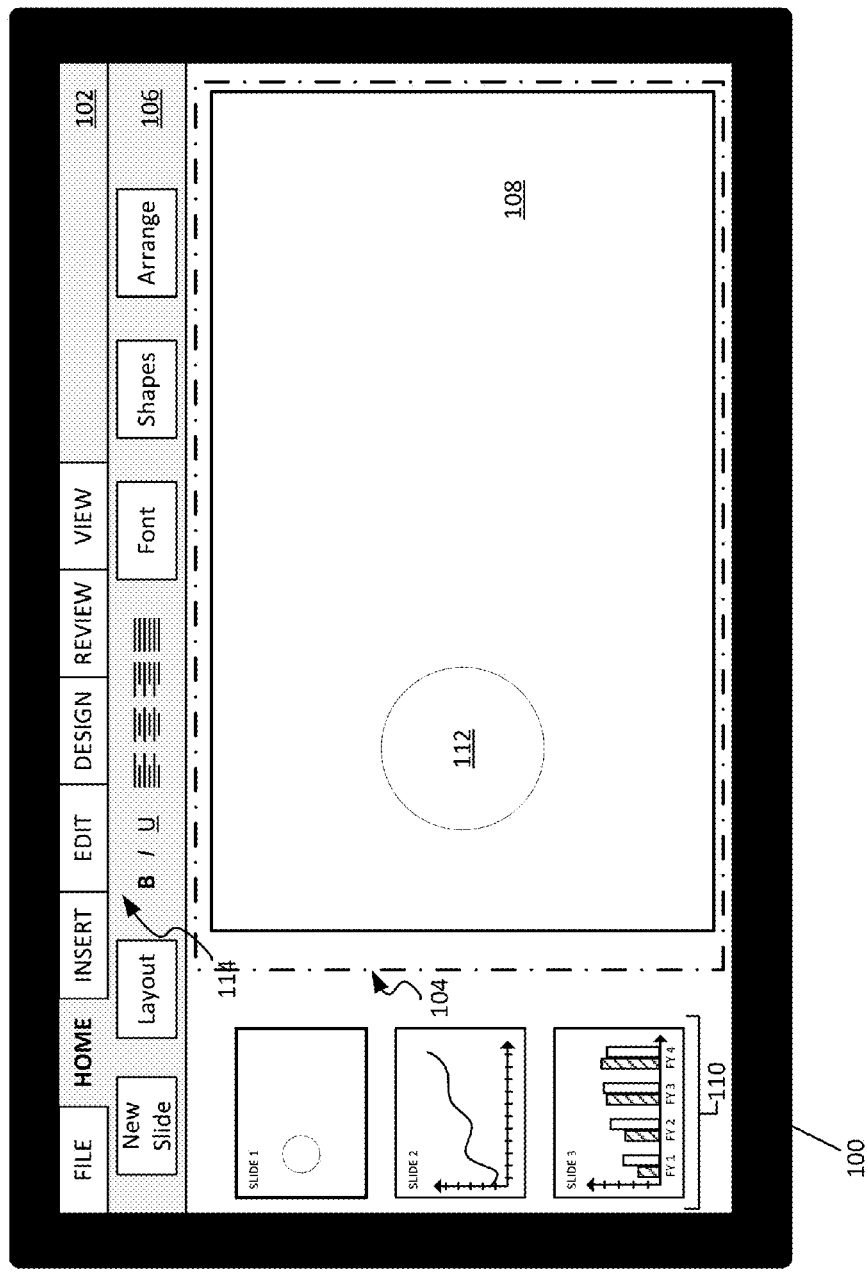
FIG. 1 illustrates an example mobile tablet device 100 on which an example presentation merged edit/read interpreter operates.

Various aspects are described more fully below with reference to the accompanying drawings, which form a part hereof, and which show specific exemplary aspects. However, aspects may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In aspects described herein, a "display" refers generally to a visual output device. One of skill in the art will appreciate that "display" may refer a variety of visual output devices including but not limited to displays utilizing LED, LCD, CRT, plasma, and OLED display technology. As described herein, displays may incorporate one or more computing devices or components of computing devices, including but not limited to processors, memory, communications interfaces, and wireless hardware, including technology conforming to various standards such as the Bluetooth and IEEE 802.11 standards.

Referring generally to the systems and methods of FIGS. 1-10, the aspects disclosed herein describe systems and methods for navigating and editing slide presentations that are operated on a computing device, such as a tablet computer or a mobile phone. In particular, aspects of the present disclosure disclose a merged edit and read mode that provides for differentiating between interacting with editing a selectable object within a slide, scrolling between slides, viewing off slide content, zooming out from a slide view, and zooming in to a slide view.

It will be noted that the present disclosure may refer to particular applications, such as presentation software, when referring to aspects of the present technology. It will be appreciated, however, that the technology is not so limited to presentation software. For example, aspects of the current technology may work with other applications such as word processing applications, spread sheet applications, database applications, web page applications, and the like.

As described herein, selectable objects are objects of an application that a creator or viewer ("user") may create, add, or select when interacting with a presentation, document, spreadsheet, etc. Generally, selectable objects refer to, for example, text boxes, pictures, embedded videos, graphs, charts, figures, and/or shapes.

Accordingly, selectable objects may be added, created, and/or edited when one or more slides of a presentation is created. For example, a figure or chart may be added to a presentation using presentation merged edit/read interpreter. Additionally, scrolling to a different slide may be performed. Additionally, adding, editing, or creating a selectable object on a different slide may also be performed. Aspects of the present disclosure allow a user, device, or application to navigate between slides and add, create, and/or edit selectable objects without necessarily having to toggle between an edit and read mode.

FIG. 1 illustrates an example user interface 100 on which an example presentation merged edit/read interpreter 102 operates. As illustrated, the presentation merged edit/read interpreter 102 displayed on the user interface 100 includes a slide workspace area 104 that contains a slide 108 and may display off slide content. Additionally, a toolbar 106, a first user interface element 110, and a selectable object 112 are illustrated.

In this example, user interface element 110 provides thumbnail views of slides in the slide deck, including a thumbnail of slide 108 and other slides in the slide deck that are not currently being displayed at full size in slide workspace area 104. If a selection of the "SLIDE 2" thumbnail in user interface element 110 were to occur, then "SLIDE 2" would be displayed at full size in slide workspace area 104. As illustrated, slide workspace 104 is indicated by the dashed line. The slide workspace area may be the area that displays both on-slide content and off-slide content. One aspect of the technology allows a slide 108 to fill the entire slide workspace area. As illustrated in FIG. 1, the slide 108 does not fill the entire slide workspace area 104.

Additionally, displayed in the example toolbar 106 are tabs 114, such as "File," "Home," "Insert," "Edit," "Design," "Review," and "View." As illustrated in this aspect, the "Home" tab is selected, thereby displaying example commands, such as "New Slide," "Layout," "Font," "Shapes," "Arrange." Other controls for font emphasis, such as bold, italics, and underline; and paragraph layout options are also displayed. In this example, the first user interface element 110, the toolbar 106 are positioned proximate to the slide 108 and therefore limit the size of the slide 108. In aspects, the toolbar 106 is entirely hidden from view and therefore does not interfere with the size of the slide 108. In some aspects, user interface elements 110 and 112 may provide guidance while creating the presentation. For example, viewing user interface element 110, which displays several slides, as thumbnails, in the slide deck may be desired to determine what content to add to a particular slide or which order to arrange the slides. Accordingly, aspects of the present disclosure increase, or optimize the size of the slide 108 displayed on the tablet computing device 100, while still providing views and easy access to the user interface elements 110.

Selectable object 112 is an object that is selectable. Selection of the object occurs when input is received to select the selectable object 112. This input may be touch input, a keystroke entry, a voice or other audio entry, and/or a gesture entry. The input may be input from a touch screen corresponding to the area that the selectable object 112 occupies. For example, a user may touch the screen corresponding to the selectable object 112, which then selects the object. In other aspects, a user uses a peripheral device such as a mouse to hover a mouse indicator over the selectable object 112 and click on the selectable object 112. In other aspects, another application or device sends the input. As illustrated, selectable object 112 is a shape (e.g., a circle) but the selectable object 112 need not be a shape. The selectable object may be a graph, a video, a text box, etc. Further, in additional aspects, one or more selectable objects are present.

A selectable object 112 may also be deselected. Deselection of a selectable object 112 occurs when input is received that indicates deselection of a selectable object 112. For example, a user may touch an area of the slide 108 that does not correspond to the selectable object 112, such as a blank area of the screen. Alternatively (or in addition), double tapping the selectable object 112 deselects the selectable object 112. Further, a selectable object 112 may be deselected by hitting a particular key of a keyboard, such as an escape key. A voice command of body motion may also be used to select or deselect a selectable object 112. In other aspects, another application or devices send the input.

Figure 2:
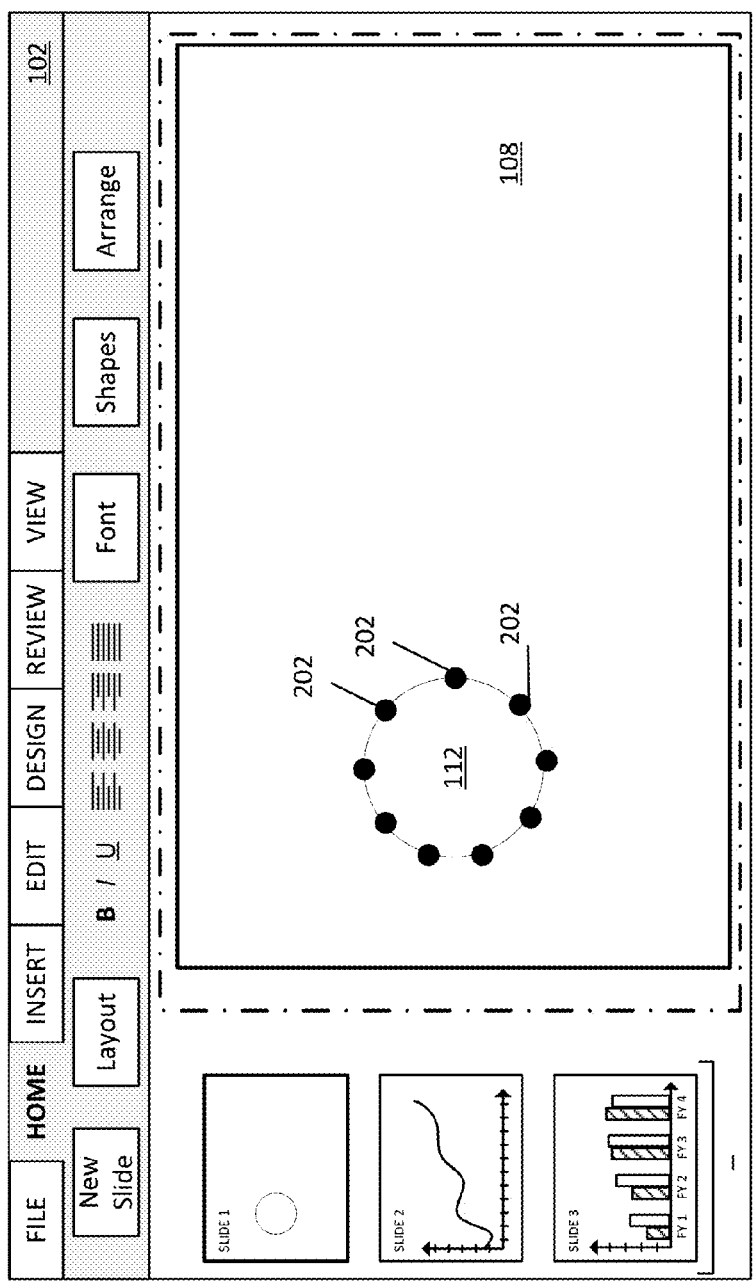
FIG. 2 illustrates an aspect of a first view of a slide workspace area of a presentation merged edit/read interpreter, wherein the selectable object has been selected.

FIG. 2 illustrates an aspect of a first view 200 of a slide workspace area 104 of a presentation merged edit/read interpreter 102, wherein the selectable object 112 has been selected. As illustrated, the selectable object 112 includes selection indicators 202.

The selection indicators 202 indicate to a user, application, or device that the selectable object 112 is selected. Selection indicators 202 include shapes (as illustrated), changes in color of the selectable object 112, dotted lines, highlights, or any other means that would indicate that the object has been selected. Multiple selectable objects 112 may be selected at once. For example a user, application, or device may select (through, for example, a user touch) multiple selectable objects 112 simultaneously. In other aspects, a user, application, or device may select (through, for example, a user touch) multiple selectable object 112 while inputting additional information to the computer (e.g., a user holding down the shift key).

When a selectable object 112 is selected, the presentation merged edit/read interpreter 102 interprets one or more inputs differently than if a selectable object 112 is not selected. Further, in an aspect, the presentation merged edit/read interpreter 102 may interpret one or more inputs differently based on the type of the selectable object 112 (e.g., graph, figure, text box, etc.). For example, when selectable object 112 is selected, the presentation merged edit/read interpreter 102 may interpret input indicative of an upward swipe differently than if the selectable object 112 were not selected. In an aspect an upward swipe causes a selectable object 112 that is selected to move upward. Similarly, in an aspect, selecting a selectable object 112 and moving a finger across the slide 108 causes the selectable object 112 to move in a path that corresponds to the path of the touch input. On the other hand, if the selectable object 112 is not selected, the presentation may interpret input indicative of an upward swipe differently than if the selectable object 112 were selected. In an aspect, an upward swipe causes the presentation to scroll or advance from slide 1 to slide 2.

Figure 3A:
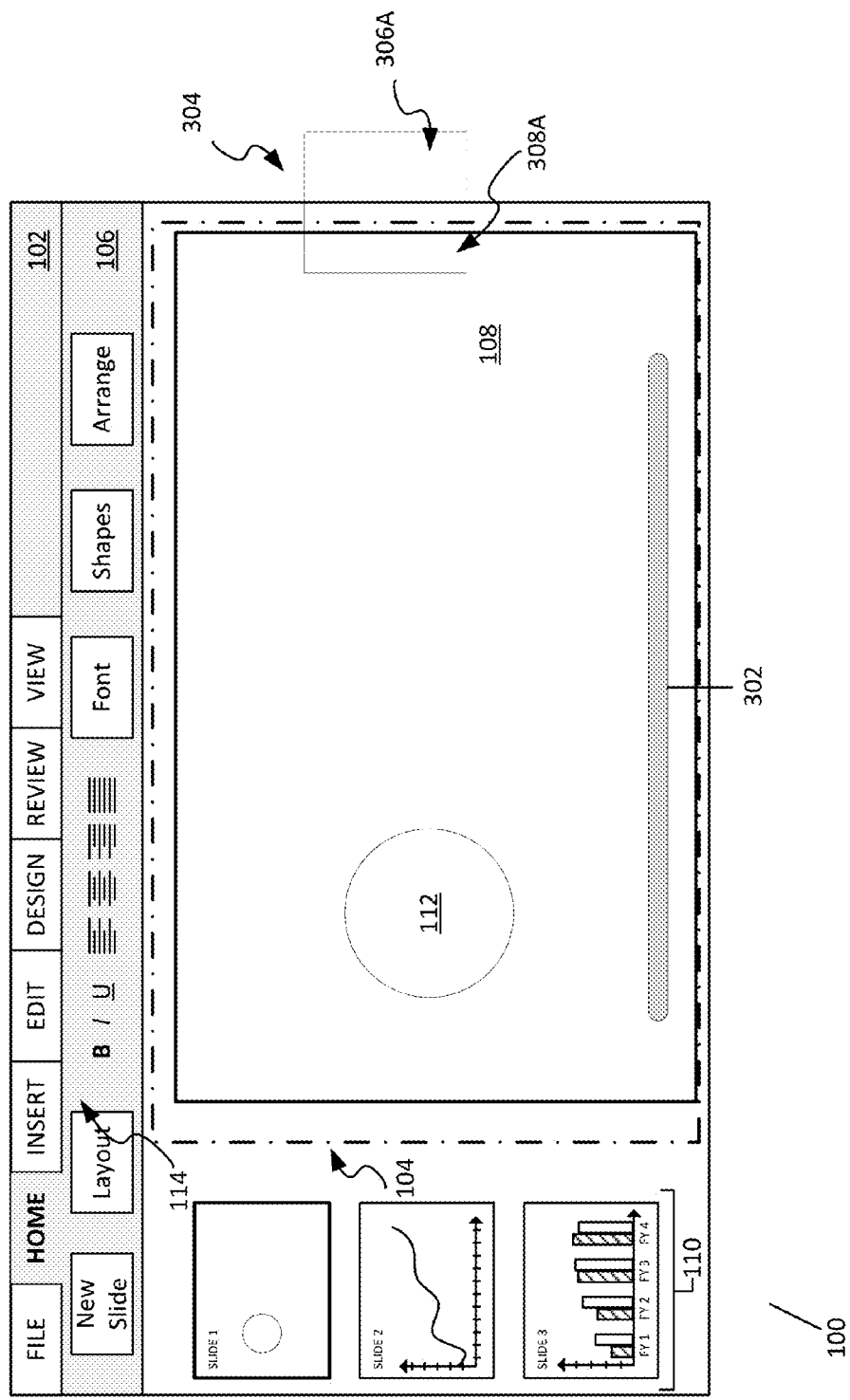
FIG. 3A illustrates an aspect of a slide with off-slide content and a horizontal off-slide scroll bar.

FIG. 3A illustrates an aspect of a slide 108 with off-slide content and a horizontal off-slide scroll bar 302. As illustrated, FIG. 3A has a horizontal off-slide scroll bar 302, a partially off-slide selectable object 304 having on-slide portion 306A and off-slide portion 308A.

The horizontal off-slide scroll bar 302 is a scroll bar that visually indicates that off-slide content is present (or addable) either to the right or to the left of the slide work space area 104. The horizontal off-slide scroll bar 302 may appear when certain input is received. For example, the horizontal off-slide scroll bar 302 may appear when a user touches certain portions of a touch screen, such as slide 108. In an aspect, when the selectable hem object 112 is selected, the horizontal off-slide scroll bar 302 fades from display. In other aspects, the horizontal off-slide scroll bar 302 remains on the display regardless of whether there is off-slide content or not. Additionally, the horizontal scroll bar 302 may appear as translucent. In another aspect, the horizontal off-slide scroll bar 302 is not visible but merely a predetermined area associated with a slide.

As illustrated, partially off-slide selectable object 304 is a square. One skilled in the art, however, will appreciate that the selectable object may be another shape or selectable object such as an image, clip art, a graph, a chart, a text box, etc. The partially off-slide selectable object 304 has two portions. The off-slide portion 308A is indicated by a dashed line and is not displayed. The on-slide portion 306A is indicated by a solid line and is displayed.

The partially off-slide selectable object 304 is selectable. For example, the partially off-slide selectable object 304 may be selectable by touching the onsite portion 306A. Other input may be used to select the partially off-slide selectable object 304. For example, a voice command, an input from a keyboard, a motion, or other input may be used. When selected, the partially off-slide selectable object 304 may be moved. For example, a user may select the partially offsite selectable object 304 and use a dragging touch motion to move the object to be entirely on slide 108.

In an aspect, touching the horizontal off-slide scroll bar 302 activates the off-slide scroll bar 302. In one aspect, activation of the off-slide scroll bar 302 may change (or indicate a change) in the way a computer interprets certain input, such as user touch input. For example, when the horizontal scroll bar 302 is activated, and a user drags a finger in a sideways motion, off-slide content that is to the right of the slide work space area 104 becomes visible. This may occur by the content on the slide 108 shifting leftward. The leftward shift may be determined length of the touch input.

Figure 3B:
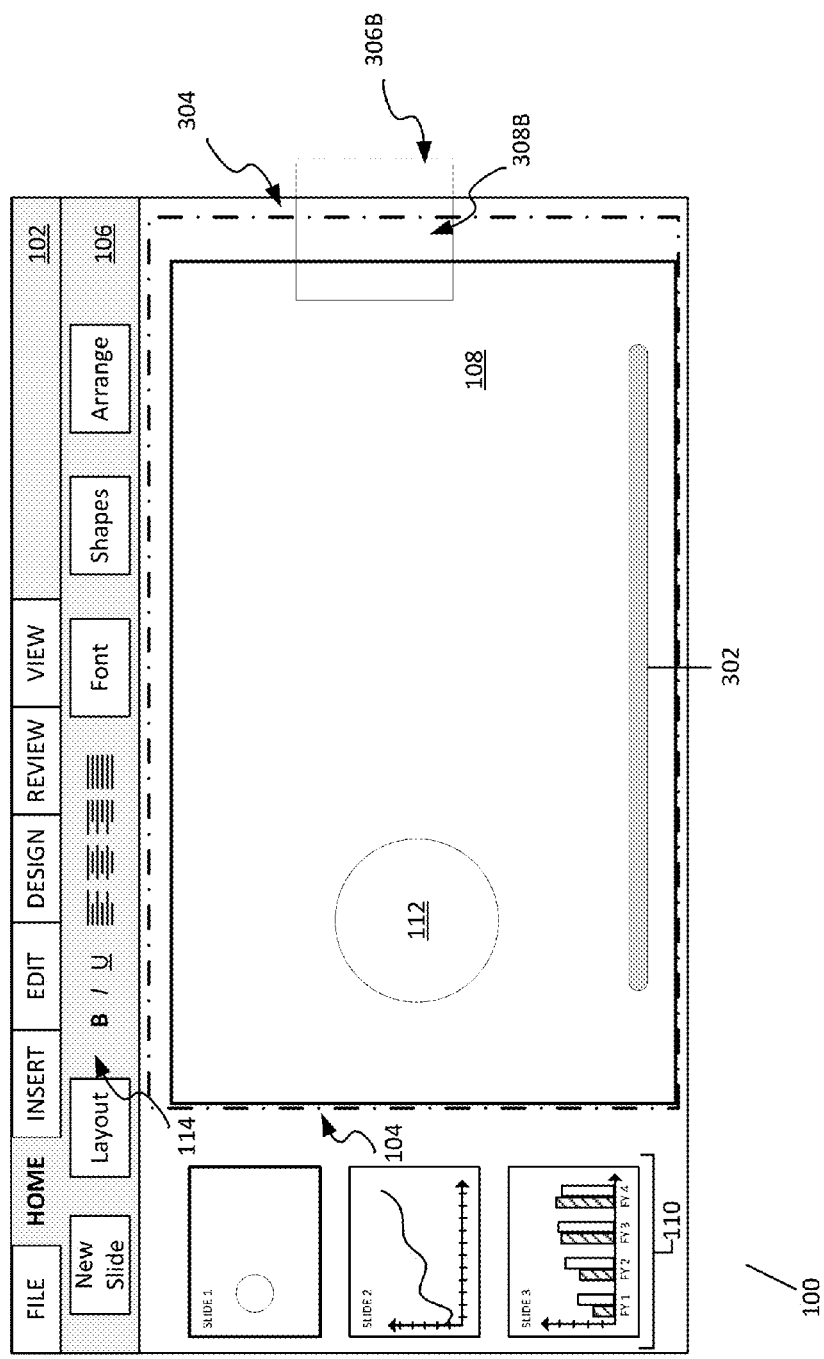
FIG. 3B illustrates an example of the result of a user interacting with the horizontal off-slide scroll bar.

FIG. 3B illustrates an example of the result of interacting with the horizontal off-slide scroll bar 302. In an aspect, FIG. 3B represents the results of activating horizontal off-slide scroll bar 302. This may occur by a user touching the area associated with the horizontal off-slide scroll bar 302 to activate the horizontal off-slide scroll bar 302. Input may have then been received to indicate a desired change in screen view. For example, a user may then have held a touch on the off-slide horizontal scroll bar 302 and moved a finger leftward to reveal more of the partially off-slide selectable object 304. In this example, the slide 108, the selectable object 112, and the partially off-slide selectable object 304 have been moved left on a display area. As such, the off-slide portion 30813 is smaller than the off-slide portion of 308A, and the on-slide portion 306B is larger than on-slide portion 306A.

Figure 4A:
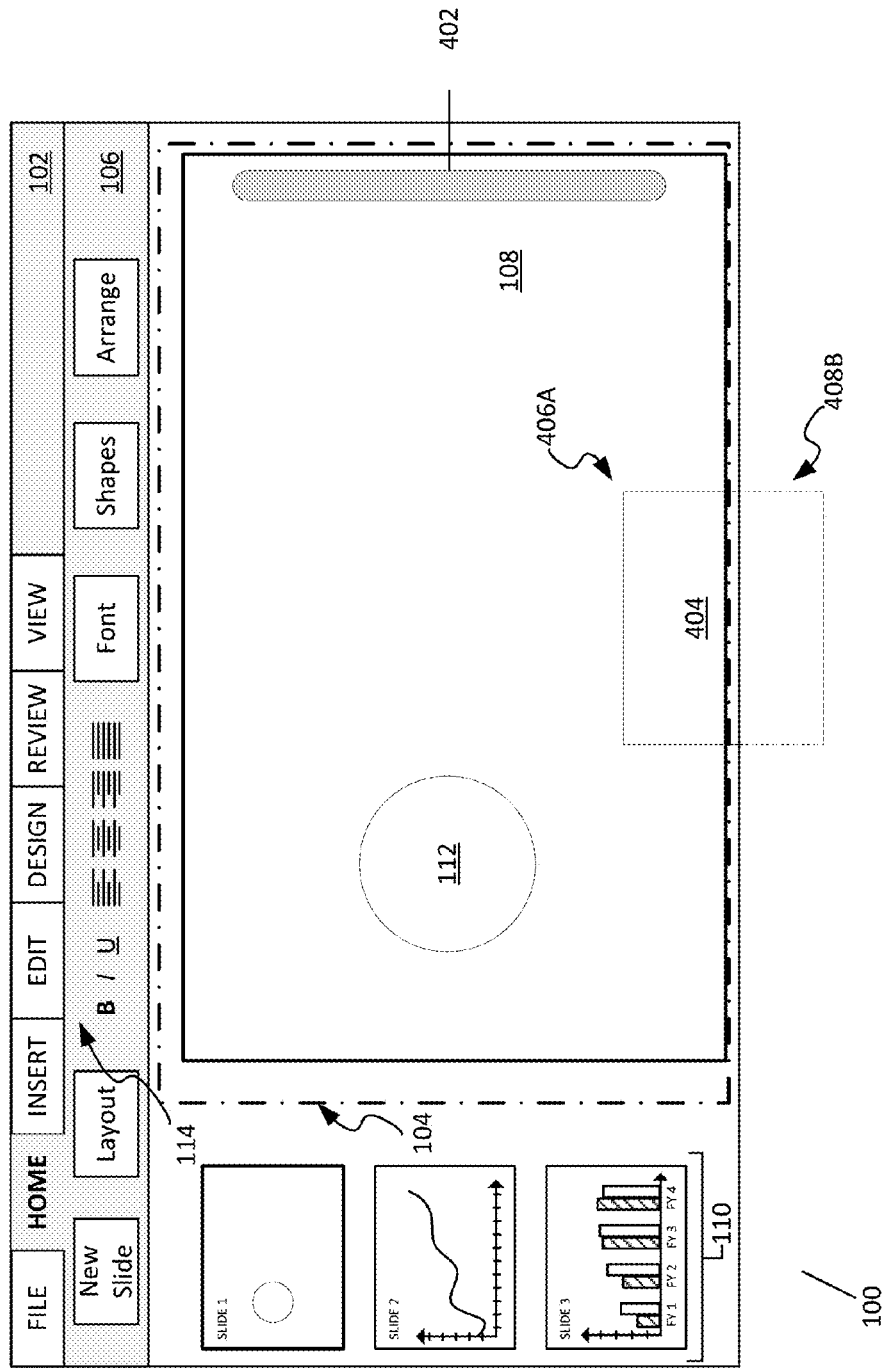
FIG. 4A illustrates an aspect of a slide with off-slide content and vertical off-slide scroll bar.

FIG. 4A illustrates an aspect of a slide 108 with off-slide content and vertical scroll bar 402. As illustrated, FIG. 4A has a vertical off-slide scroll bar 402, a partially off-slide selectable object 404 having on-slide portion 406A and off-slide portion 408A.

The vertical off-slide scroll bar 402 is a scroll bar that visually indicates that off-slide content is present (or addable) either below or above the slide workspace area 104. The vertical scroll bar may appear when certain input is received. This input may occur when a user touches certain portions of a touch screen, such as slide 108. In an aspect, when selectable object 112 is selected, the vertical off-slide scroll bar 402 fades from display. In other aspects, the vertical off-slide scroll bar 402 remains on the display regardless of whether there is off-slide content or not. The scroll bar 402 may appear as translucent. In another aspect, the vertical off-slide scroll bar 402 is not visible but merely a predetermined area associated with a slide.

As illustrated, partially off-slide selectable object 404 is a square. The partially off-slide selectable object has two portions. The off-slide portion 408A is indicated by a dashed line and is not displayed. The on-slide portion 406A is indicated by a solid line and is displayed. The partially off-slide selectable object 404 is selectable. For example, the partially off-slide selectable object 404 may be selected by the device receiving an input, such as a user touching the onsite on-slide portion 406A. When selected, the partially off-slide selectable object 404 may be moved. For example, a user may select the partially off-slide selectable object 404 and use a dragging touch motion to move the object to be entirely on slide 108.

In an aspect, touching the vertical off-slide scroll bar 402 activates the vertical off-slide scroll bar 402. Activation of the vertical off-slide scroll bar 402 changes the way input is interpreted. This input may be touch input, a keystroke entry, a voice or other audio entry, and/or a gesture entry. For example, when the vertical scroll bar 402 is activated and the device receives input indicating a user dragged a finger in an upward motion, off-slide content that is below slide workspace area 104 becomes visible. This may occur by the content on the slide 108 shifting upward. The upward shift may be determined amount length of the touch input.

Figure 4B:
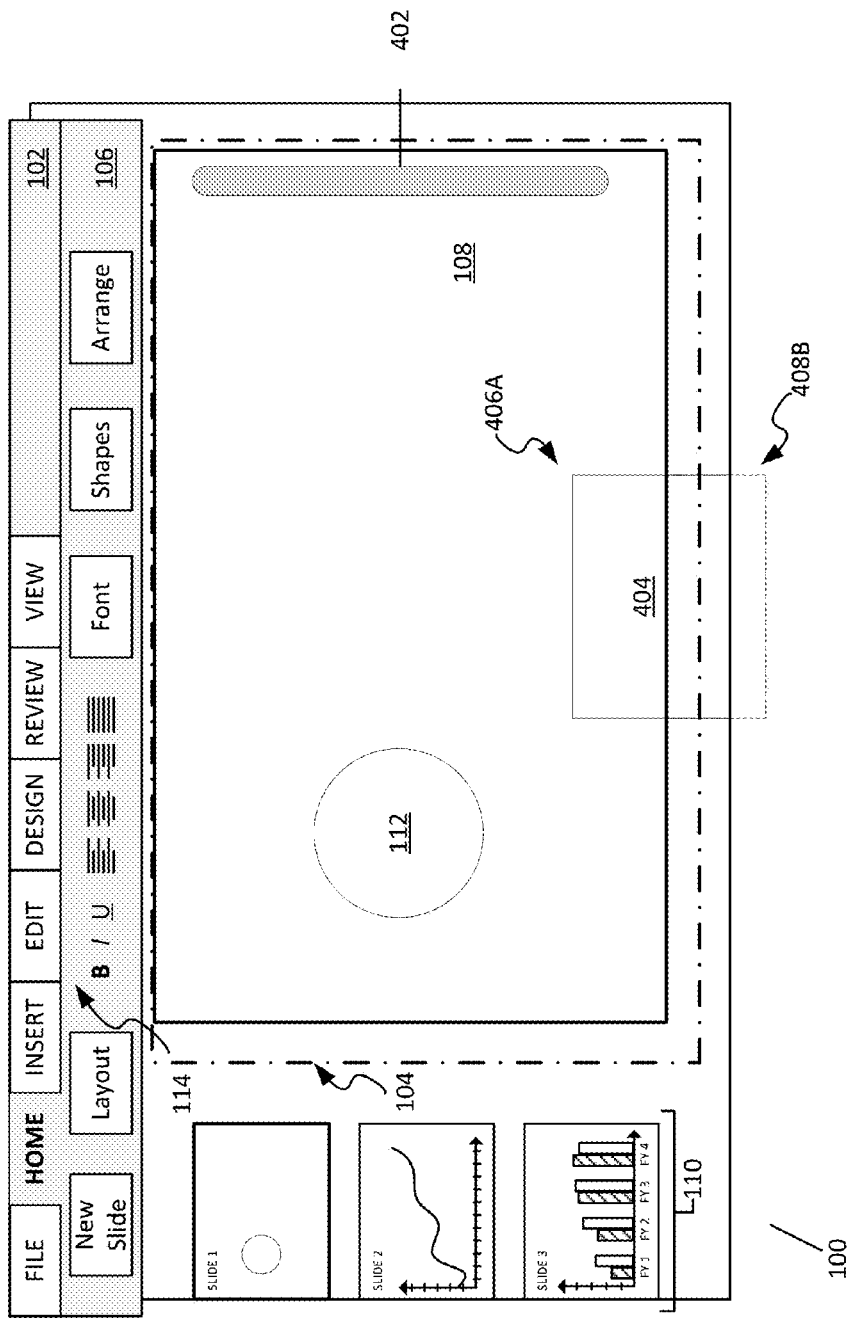
FIG. 4B illustrates an example of the result of a user interacting with the vertical off-slide scroll bar.

FIG. 4B illustrates an example of the result of an interaction with the vertical off-slide scroll bar 402. In an aspect, FIG. 4B represents the results of an interaction with vertical off-slide scroll bar 402 to activate the off-slide scroll bar 402. This interaction may be touch input, a keystroke entry, a voice or other audio entry, and/or a gesture entry. In an aspect, the device may receive input, such as input indicative of a user holding a touch on the vertical off-slide scroll bar 402 and moving a finger upward. Such input may then reveal more of the partially off-slide selectable object 404. In this example, the slide 108, the selectable object 112, and the partially off-slide selectable object 404 have been moved up on a display area. As such, the off-slide portion 408B is smaller than the off-slide portion of 408A, and the on-slide portion 406B is larger than on-slide portion 406A.

Figure 5:
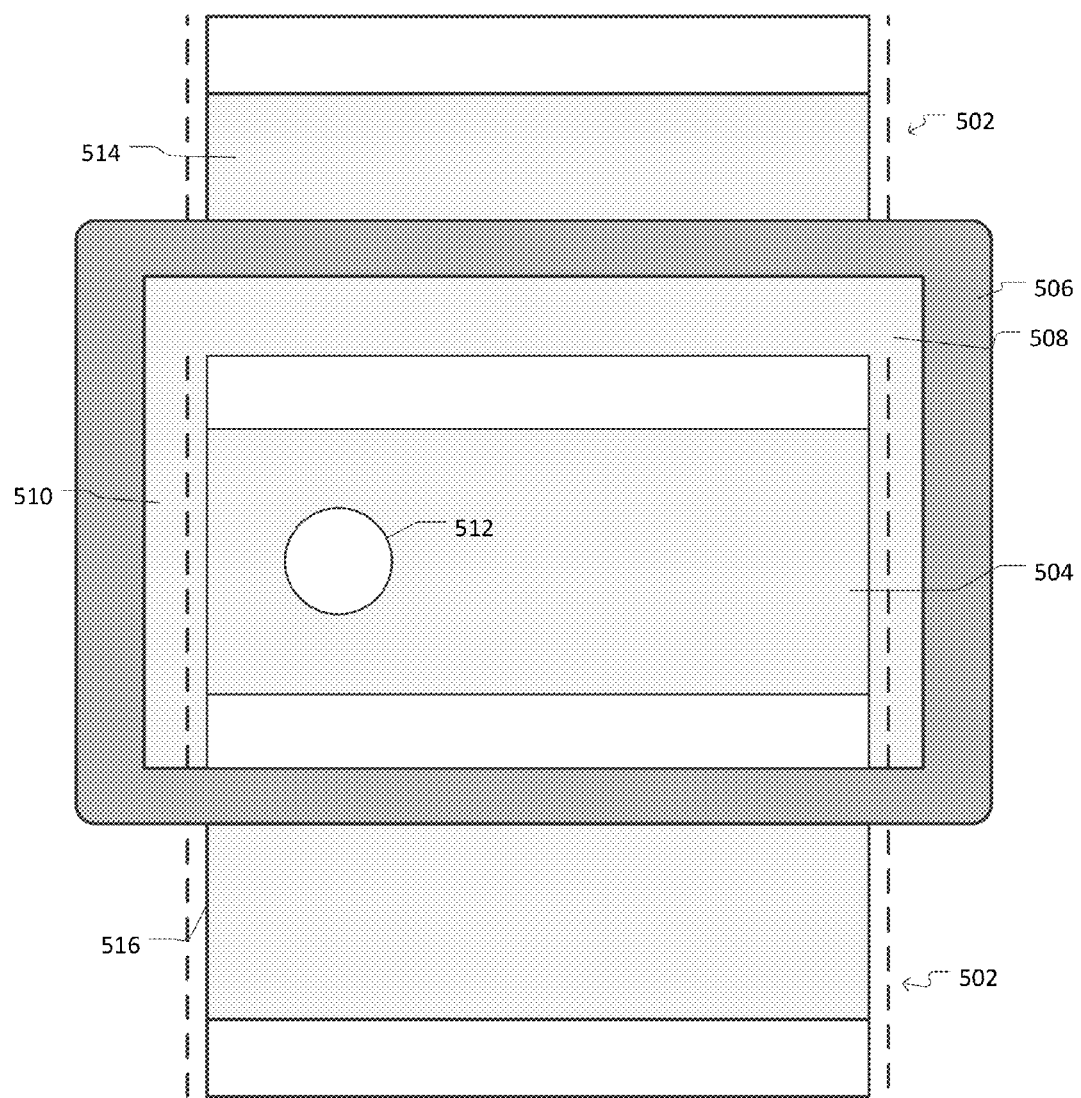
FIG. 5 illustrates an aspect of a slide deck that is capable of scrolling and slide advancement.

FIG. 5 illustrates an aspect of a slide deck 502 that is capable of scrolling and slide advancement. The slide deck 502 has a current slide 504 being displayed on a user interface 506. The current slide 504 is editable and navigable using a presentation merged edit/read interpreter 508 and has a slide selection interface 510. As illustrated, the current slide has a selectable object 512.

A slide deck 502 includes one or more slides such as a current slide 504, a previous slide 514, and a next slide 516. The term "in focus" may be used describe a slide that is capable of being currently edited. For example, a merged edit/read interpreter 508 may be overlaid on an image of current slide 504. The merged edit/read interpreter 508 would allow a user to change, add, or delete selectable objects. Additionally, other functions may be performed on the slide, such as changing the theme, background color, etc.

Aspects of the current technology include having slides be represented as images when users are scrolling through a slide deck. Accordingly, during scrolling the slides of a slide deck are images rather than fully editable slide. One aspect of this technology allows a input to be received to scroll through the slide deck using a slide selection interface 510. Such input may be a touch, a keystroke entry, a voice or other audio entry, and/or a gesture entry. Slide selection interface 510 may display one or more slides of a slide deck, similar to that of the user selection interface 110 as described with reference to FIG. 1. For example, a user may slide a finger in a downward motion over the slide selection interface 510. This may cause the slides (or the images of a slides) to scroll upward. When input is received that indicates that the device should stop scrolling (e.g., input pausing for a set time, such as a second, or receiving input indicating that a user has released a swipe after a slide is in display) a merged edit/read interpreter 508 loads a merged editable/readable version of the selected slide. Selection of the slide may be determined based on the position of the slide when input that indicates to stop scrolling is received (e.g., an editable/readable version of slide is loaded if the slide is substantially centered in the middle of user interface 506). The edit/read interpreter 508 may then fade out a previously in-focus slide, and fade-in the selected slide.

Other slides may be described as "out of focus." This is used to describe slides that are not capable of being edited in the present state. For example a previous slide 514 or next slide 516 may be available as an image rather than a fully editable slide. Such a configuration may help to conserve computer resources given that slides that are off screen are difficult for users to interact edit.

In an aspect, when input is received into the user interface 506, and no object selected, the presentation merged edit/read interpreter 508 interprets the input, such as a user swipe, to be a scrolling command. For example, when input such as an upward swipe is received, the presentation merged edit/read interpreter 508 may interpret the upward swipe as a command to scroll the slide deck 502. Scrolling the slide deck 502 may cause one or more additional slides, such as next slide 516, to be displayed by the mobile user interface 506.

Scrolling may allow images of one or more slides to be displayed, such as previous slide 514 or next slide 516. Slides may continue to be displayed as images until the user interface 506 receives input indicative that editing a slide may to occur. For example, the user may advance through slides by swiping on a touch screen. When the user views the slide that the user wishes to edit, the user may lift the touch. In an aspect, this causes a slide to be in focus for editing.

In an aspect, a short upward swipe causes the slide deck 502 to advance to the next slide 516. Advancement, in an aspect, causes the next slide 516 to be in focus such that one or more selectable objects associated with the next slide 516 is overlaid onto an image of the next slide 516, which allows for a user to edit the selected objects associated with the next slide 516.

Additionally, the presentation merged edit/read interpreter 508 may determine that the input is insufficient to advance a slide upon receiving a short swipe up, however. For example, when selectable object 512 is not selected, and the presentation merged edit/read interpreter 508 receives input indicative of a swipe up, the presentation merged edit/read interpreter may first determine that the swipe up is insufficient to scroll down. This may occur because a swipe up does not cause at least ⅓ of the next slide 516 to be displayed on the user interface 506. Other criteria may be used, such as length of swipe relative to screen size.

Figure 6:
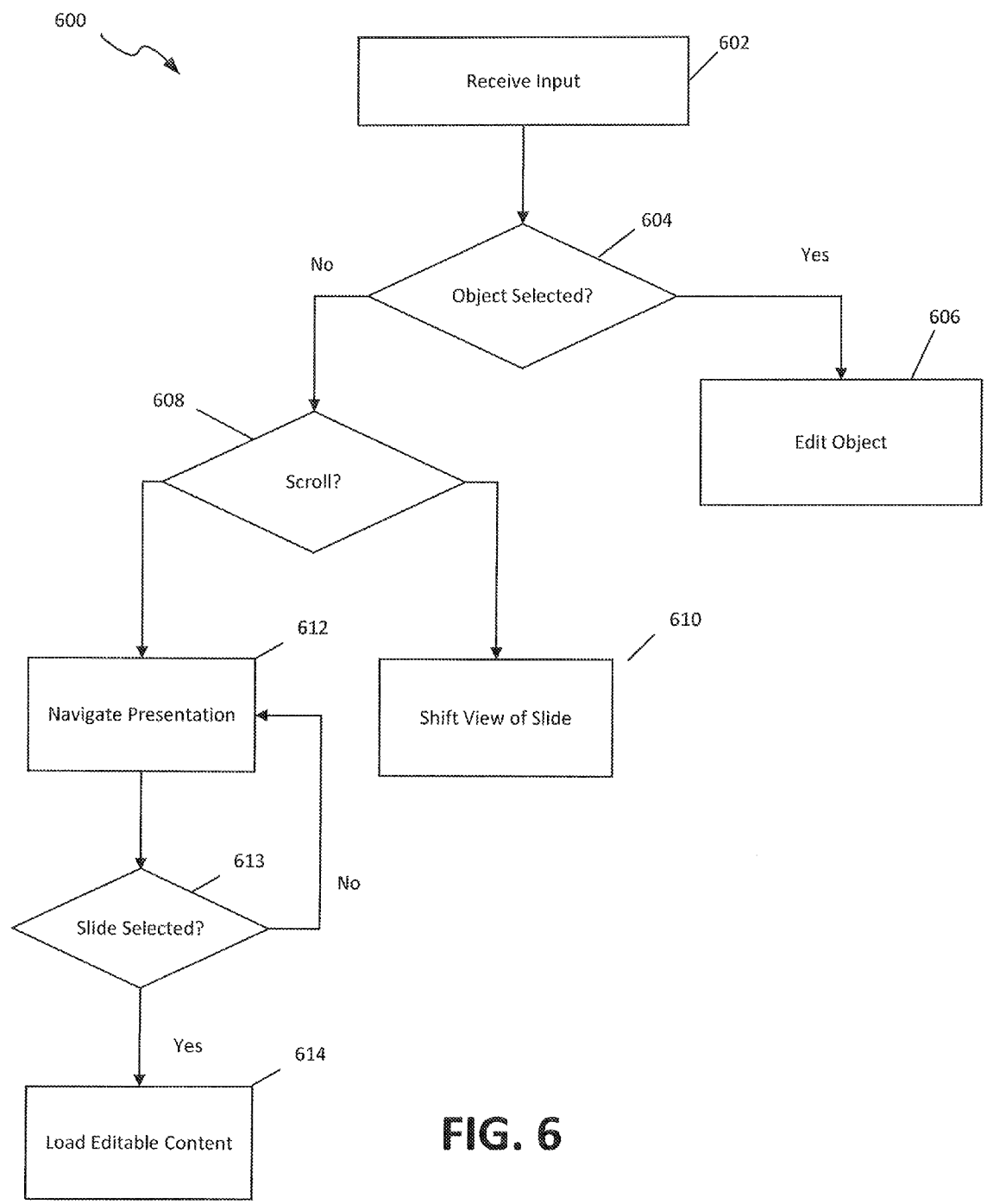
FIG. 6 is a method for determining input.

FIG. 6 is a method 600 for determining input. The method 600 may be implemented using hardware, software, or a combination hardware and software. The method 600 begins with receiving input operation 602. This input may be touch input, a keystroke entry, a voice or other audio entry, and/or a gesture entry. For example, received input may be a downward swipe, an upward swipe, a leftward swipe, or a rightward swipe on a touch screen, Additionally, a touch input may be a tracing motion. The method then proceeds to determine object selection operation 604, where it is determined whether an object has been selected. Objects may be selected by receiving touch input in an area representing a selectable object. If it is determined that a selectable object has been selected, the object is edited at edit object operation 606, In edit object 606, the object is edited based on the received input received at receive input operation 602. In an aspect, the object is edited based as follows: an upward swipe moves the object upward, a downward swipe moves the object downward, a pinching input shrinks the object, etc. One of skill in the art will appreciate that other types of input may be used without departing from the scope of this disclosure.

The method proceeds from object selection determination 604 to scroll determination 608 if no object is selected. In scroll determination 608, a determination is made as to whether a selection or input has been received so as to indicate to scroll within the current slide. For example, a horizontal or vertical (or other) scroll bar may be selected. In other embodiments, there may be a particular keystroke combined with a touch movement on a specific portion of the screen. Scrolling may also include detection of a specific touch input such as a pinch so as to cause the screen to shrink. If it is determined to scroll within the slide, the view of the slide is changed at shift view of slide operation 610.

In shift view of slide operation 610, the view is shifted based on the received input received at receive input operation 602. In an aspect, a horizontal scroll bar is selected, and the received input is a touch swipe leftward. The touch swipe leftward may cause the viewing area of a slide to shift right. In an aspect, this reveals off-slide content. In an additional aspect, a vertical horizontal scroll bar is selected, and the received input is a touch swipe downward. The touch swipe downward may cause the viewing area of the slide to shift up to reveal off-slide content below the original view of the screen. In an aspect, a pinching input shrinks the slide revealing more of a workspace area. A shift in view may reveal one or more additionally selectable items.

If no scroll bar is selected, the operation proceeds to navigate presentation operation 612. In navigate presentation operation 612 the presentation is navigated based on the received input. For example, a downward swipe on a slide scrolls the slide deck to the next slide, an upward swipe on a slide scrolls the slide deck to a previous slide, etc. One of skill in the art will appreciate that other types of input may be used without departing from the scope of this disclosure. In an aspect of the technology, when navigate presentation operation 612 navigates between slides, only an image of the slide may be displayed as the slides are transitioning from slide to slide. This may allow for computational resources to be saved. For example, there may be less processing memory used to display the image of a slide rather than displaying a fully editable slide.

Navigate presentation operation 613 proceeds to slide selected determination 613, In slide selected determination 613, a determination as to whether a slide has been selected is made. Slide selection may occur when the input resulting in scrolling pauses for a set time (such as a second) or input is received indicating that a user has released a swipe after a slide is in display, if no slide is selected, the operation returns to navigate presentation operation 612. If a slide is selected, the selected slide becomes in focus such that any editable objects associated with the selected slide are editable. Additionally, other functions may be performed on the slide, such as changing the theme, background color, etc.

Figure 7:
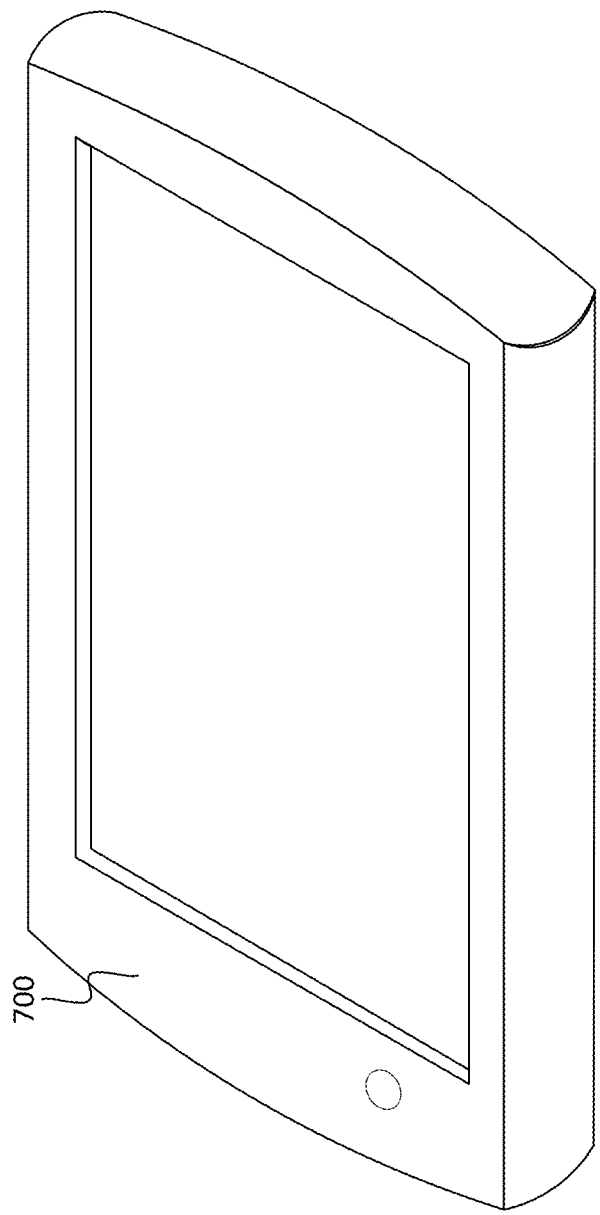
FIG. 7 illustrates a tablet computing device for executing one or more aspects of the present disclosure.
Figure 8:
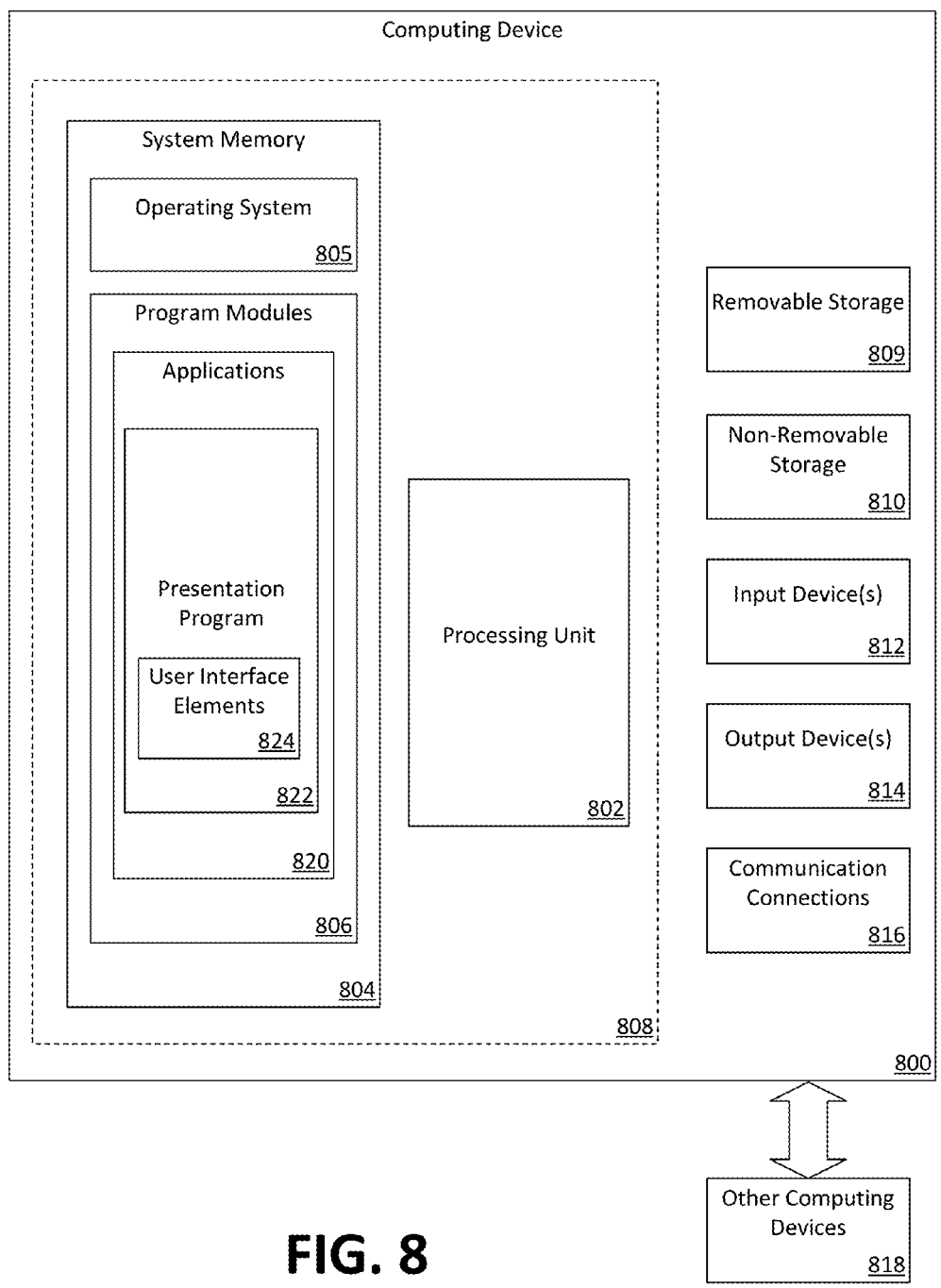
FIG. 8 illustrates a block diagram of a computing environment suitable for implementing one or more aspects disclosed herein.

The aspects and functionalities described herein may operate via a multitude of computing systems including, without limitation, wired and wireless computing systems, mobile computing systems (e.g., mobile telephones, netbooks, tablet or slate type computers, and laptop computers). FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the technology may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 8 through 9B and the associated descriptions provide a discussion of a variety of operating environments in which aspects of the present disclosure may be practiced. However, the devices and systems illustrated and discussed with respect to FIGS. 8 through 9B are for purposes of example and illustration and are not limiting of a vast number of computing device configurations that may be utilized for practicing aspects of the present disclosure, described herein.

FIG. 8 is a block diagram illustrating exemplary physical components of a computing device 800 with which aspects of the present disclosure may be practiced. The computing device components described below may be suitable for the computing devices described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination. The system memory 804 may include an operating system 805, one or more program modules 806, which are suitable for running applications 820, such as a presentation program 822 on which user interface elements 824, as described herein, are displayed. The operating system 805, for example, may be suitable for controlling the operation of the computing device 800. Furthermore, aspects of the present disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 may perform processes including, for example, one or more of the stages of the methods described herein. The aforementioned process is an example, and the processing unit 802 may perform other processes. Other program modules that may be used in accordance with aspects of the present disclosure may include electronic mail and contacts applications, word processing applications, spreadsheet applications, database applications, slide presentation applications, drawing or computer-aided application programs, etc.

Generally, consistent with aspects of the present disclosure, program modules may include routines, programs, components, data structures, and other types of structures that may perform particular tasks or that may implement particular abstract data types. Moreover, aspects of the present disclosure may be practiced with other computer system configurations, including hand-held devices, multi-processor systems, microprocessor-based or programmable consumer electronics, minicomputers, mainframe computers, and the like. Aspects of the present disclosure may also be practiced in distributed computing environments where tasks are performed by remote processing devices that are linked through a communications network. In a distributed computing environment, program modules may be located in both local and remote memory storage devices.

Furthermore, aspects of the present disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the present disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 800 on the single integrated circuit (chip). Aspects of the present disclosure may also be practiced using other technologies capable of performing logical operations such as, for example, AND, OR, and NOT, including but not limited to mechanical, optical, fluidic, and quantum technologies. In addition, aspects of the present disclosure may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal. The computing device 800 may also have one or more input device(s) 812 such as a keyboard, a mouse, a pen, a sound input device, a touch input device, etc. The output device(s) 814 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The computing device 800 may include one or more communication connections 816 allowing communications with other computing devices 818. Examples of suitable communication connections 816 include, but are not limited to, RF transmitter, receiver, and/or transceiver circuitry; universal serial bus (USB), parallel, and/or serial ports.

Figure 9A:
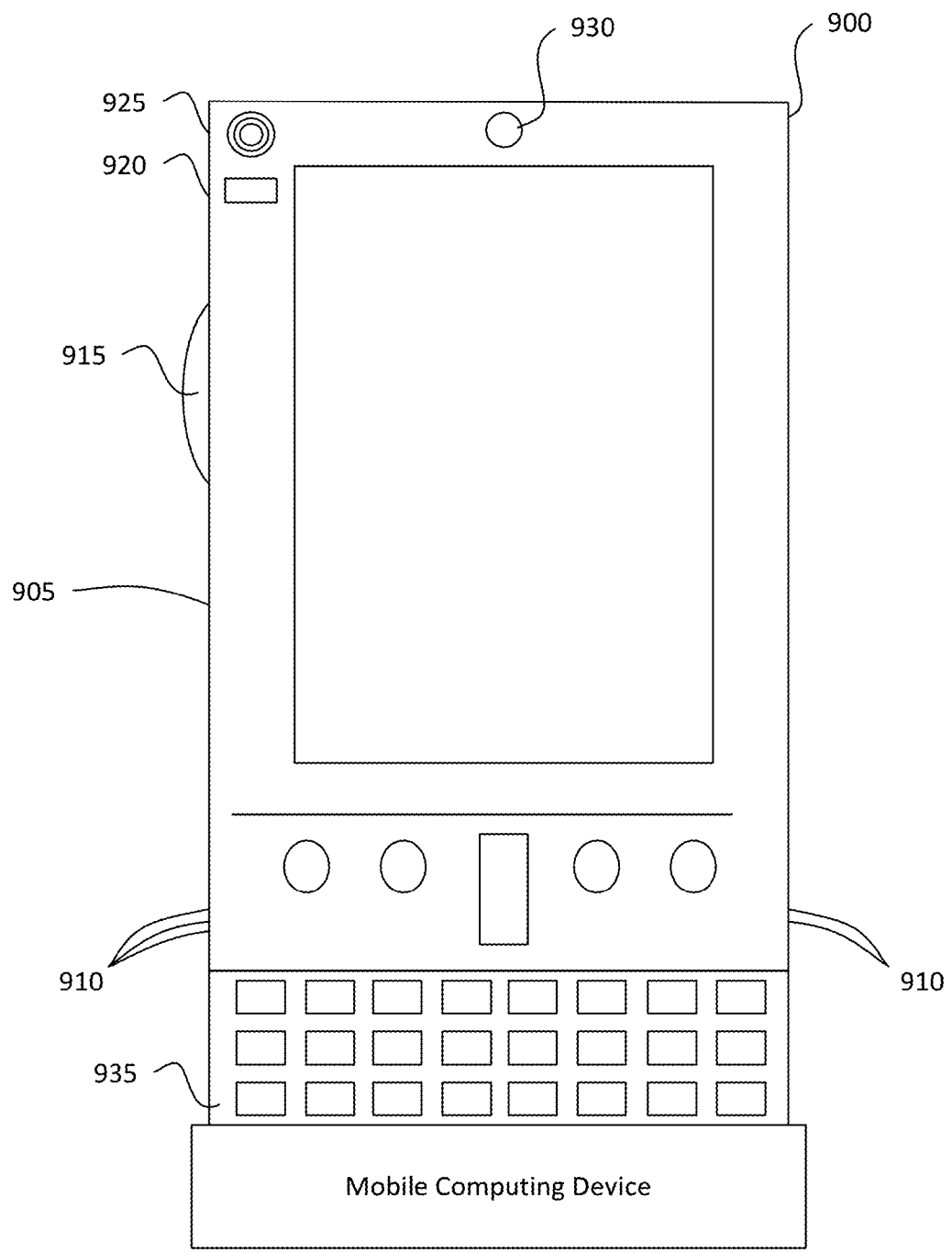
FIG. 9A illustrates one aspect of a mobile computing device executing one or more aspects disclosed herein.
Figure 9B:
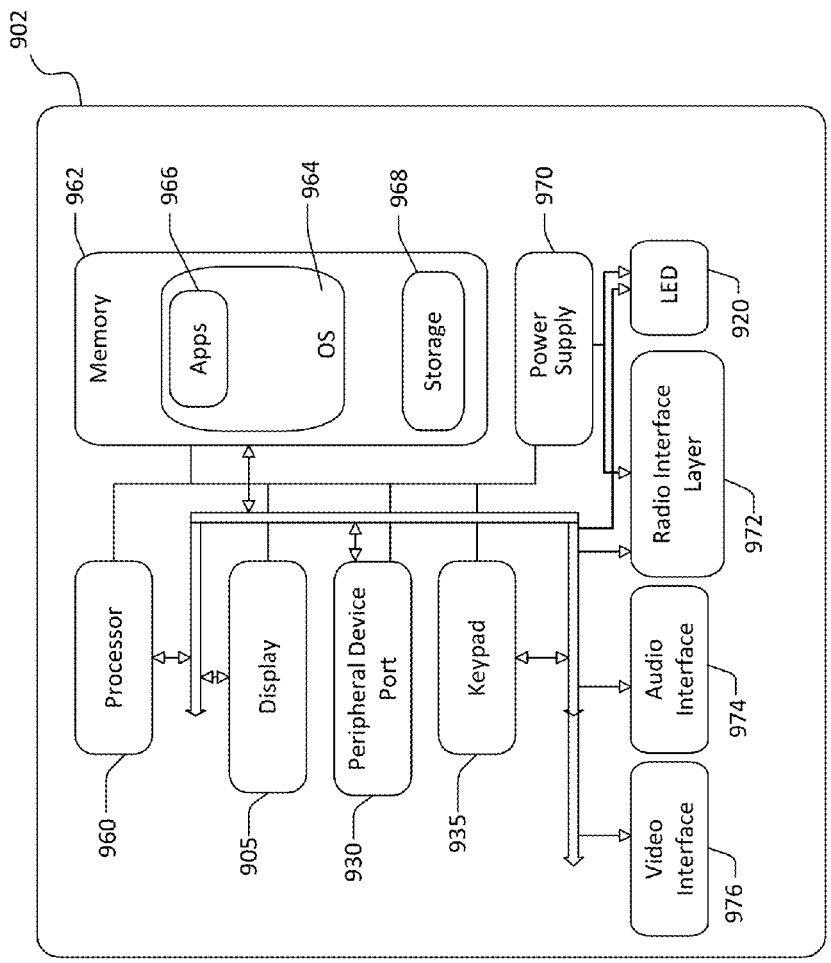
FIG. 9B is a simplified block diagram of an exemplary mobile computing device suitable for practicing one or more aspects disclosed herein.

FIGS. 9A and 9B illustrate a mobile computing device 900, for example, a mobile telephone, a smart phone, a tablet personal computer, a laptop computer, and the like, with which aspects of the present disclosure may be practiced. With reference to FIG. 9A, an exemplary mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some aspects. In yet another alternative aspect, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

Although described herein in combination with the mobile computing device 900, in alternative aspects, features of the present disclosure may be used in combination with any number of computer systems, such as desktop environments, laptop or notebook computer systems, multiprocessor systems, micro-processor based or programmable consumer electronics, network PCs, mini computers, main frame computers and the like. Aspects of the present disclosure may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate aspects of the present disclosure.

FIG. 9B is a block diagram illustrating the architecture of one aspect of a mobile computing device. That is, the mobile computing device 900 can incorporate a system (i.e., an architecture) 902 to implement some aspects. In one aspect, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

The system 902 has a power supply 970, which may be implemented as one or more batteries. The power supply 970 might further include an external power source, such as an AC adapter or a powered docking cradle that supplements or recharges the batteries.

The system 902 may also include a radio 972 that performs the function of transmitting and receiving radio frequency communications. The radio 972 facilitates wireless connectivity between the system 902 and the "outside world", via a communications carrier or service provider. Transmissions to and from the radio 972 are conducted under control of the operating system 964. In other words, communications received by the radio 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated aspect, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

Figure 10:
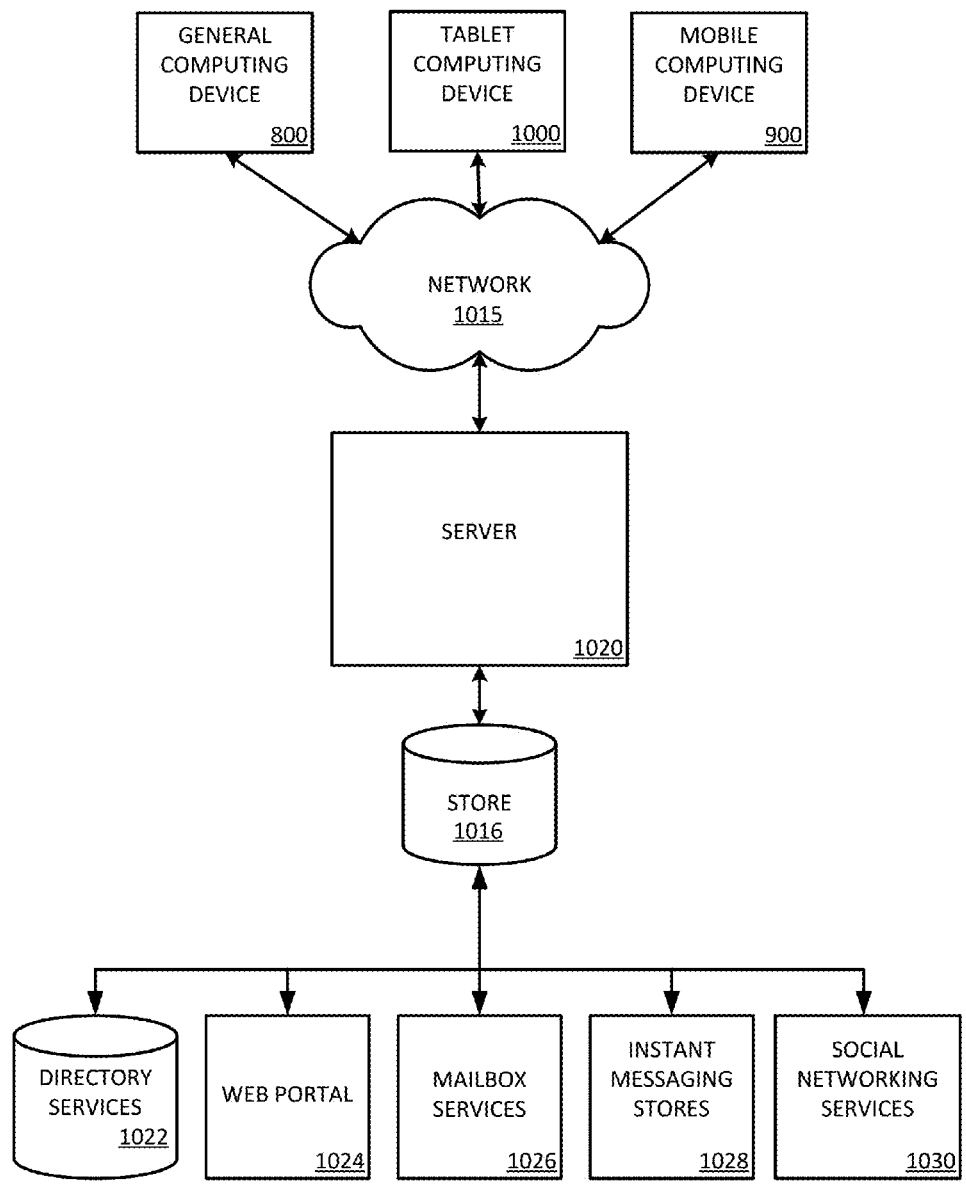
FIG. 10 is a simplified block diagram of a distributed computing system for practicing one or more aspects disclosed herein.

FIG. 10 illustrates one aspect of the architecture of a system for interpreting user input by one or more client devices, as described above. Content developed, interacted with, or edited may be stored in different communication channels or other storage types. For example, various documents may be stored using a directory service 1022, a web portal 1024, a mailbox service 1026, an instant messaging store 1028, or a social networking service 1030. An application for implementing the aspects disclosed herein may use any of these types of systems or the like for enabling data utilization, as described herein. A server 1020 may provide the application to clients. As one example, the server 1020 may be a web server providing the application over the web. The server 1020 may provide the application over the web to clients through a network 1015. By way of example, the client computing device may be implemented as the computing device 800 and embodied in a personal computer, a tablet computing device 1000 and/or a mobile computing device 900 (e.g., a smart phone). Any of these aspects of the client computing device 800, 1000, 900 may obtain content from the store 1016.

One aspect of the technology includes a method for interpreting user input in an application. The method includes displaying a first editable workspace area. The editable workspace area includes a first editable item. The first editable item includes a selectable object. The method includes determining that the selectable object is selected. The method also includes receiving input. Additionally, the method includes editing the selectable object based on the received input. The first editable item may be a slide, a page, or a spreadsheet. The input may be touch, Such touch input may be touch input indicative of an upward swipe. This may result in editing the selectable object such that the selectable object moves up based on the upward swipe. The method may also include receiving input to deselect the selectable object, deselecting the selectable object, and after deselecting the selectable object, receiving a new input, and interacting with the first editable item based on the new input. The input may be an upward swipe, and the interaction with the first editable item may include advancing from the first editable item to a second editable item such that the first editable item is no longer displayed. The method may also include displaying off-slide content such that displaying off-slide content includes advancing to the second editable item, displaying an off-slide scroll bar, receiving input indicating interaction with an off-slide scroll bar, and moving the second editable item to reveal off-slide content.

An additional aspect of the technology includes a computer readable storage device. The computer readable storage device may store instructions that, when executed, is capable of performing at least one of the methods described above.

An additional aspect to the technology includes a computer system. The computer system may include a processor electronically coupled to an input device, an output device, and memory, the memory housing instructions that, upon execution, perform at least one of the methods described above.

One skilled in the relevant art may recognize, however, that the aspects may be practiced without one or more of the specific details, or with other methods, resources, materials, etc. In other instances, well known structures, resources, or operations have not been shown or described in detail merely to avoid obscuring aspects of the aspects.

The description and illustration of one or more aspects provided in this disclosure are not intended to limit or restrict the scope of the technology as claimed in any way. The aspects, examples, and details provided in this disclosure are considered sufficient to convey possession and enable others to make and use the best mode of claimed technology. The claimed technology should not be construed as being limited to any aspect, example, or detail provided in this disclosure. Regardless of whether shown and described in combination or separately, the various features (both structural and methodological) are intended to be selectively included or omitted to produce an aspect with a particular set of features. Having been provided with the description and illustration of the present disclosure, one skilled in the art may envision variations, modifications, and alternate aspects falling within the spirit of the broader aspects of the general inventive concept embodied in this disclosure that do not depart from the broader scope of the claimed technology.

What is claimed:

1. A method for interpreting user input in an application the method comprising:
    displaying a first editable workspace area of an application, wherein the editable workspace area includes a first editable item, the first editable item including an object that is selectable and de-selectable;
    determining that the object is selected;
    receiving input;
    determining to edit the object based on the object being selected;
    editing the object based on the received input;
    receiving input specifying that the object displayed in the first editable workspace area be deselected;
    in response to receiving the input specifying that the object displayed in the first editable workspace area be deselected, deselecting the object in the displayed first editable workspace area;
    after deselecting the object, receiving a new input; and
    based on the new input, advancing to a second editable workspace area of the application.

2. The method of claim 1, wherein the first editable item is a slide, a page, or a spreadsheet.

3. The method of claim 1 wherein the editing the object includes moving up the first editable item based on upward swipe.

4. The method of claim 1, further comprising interacting with the first editable item by advancing from the first editable item to a second editable item such that the first editable item is no longer displayed.

5. The method of claim 4 further comprising;
    displaying off-item content, wherein displaying off-item content comprises:
    after advancing to the second editable item, displaying an off-slide scroll bar;
    receiving input indicating interaction with an off-item scroll bar; and
    moving the second editable item to reveal off-slide content.

6. The method of claim 1, wherein the application is a presentation application.

7. The method of claim 1, wherein the object is an image.

8. The method of claim 1, wherein the input is a touch.

9. The method of claim 8, wherein the touch is indicative of an upward swipe.

10. The method of claim 8, wherein the new input is a new touch input indicative of a second upward swipe.

11. A computer readable storage device, wherein the computer readable storage device stores instructions that, when executed, is capable of performing the following method:
    displaying a first editable workspace area of an application, wherein the editable workspace area includes a first editable item, the first editable item including an object that is selectable and de-selectable;
    determining that the object is selected;
    receiving input;
    determining to edit the object based on the object being selected;
    editing the object based on the received input;
    receiving input specifying that the object displayed in the first editable workspace area be deselected;
    in response to receiving the input specifying that the object displayed in the first editable workspace area be deselected, deselecting the object in the displayed first editable workspace area;
    after deselecting the object, receiving a new input; and
    based on the new input, advancing to a second editable workspace area of the application.

12. The computer readable storage device of claim 11, wherein the first editable item is a slide, a page, or a spreadsheet.

13. The computer readable storage device of claim 11, wherein the input is a touch.

14. The computer readable storage device of claim 13, wherein the touch input is indicative of an upward swipe, and further wherein the editing the object includes moving up the first editable item based on the upward swipe.

15. The computer readable storage device of claim 14, wherein the received input is an upward swipe, and further wherein interaction with the first editable item includes advancing from the first editable item to a second editable item such that the first editable item is no longer displayed.

16. The computer readable storage device of claim 15 further comprising;
    displaying off-item content, wherein displaying off-item content comprises:
    after advancing to the second editable item, displaying an off-slide scroll bar;
    receiving input indicating interaction with an off-item scroll bar; and
    moving the second editable item to reveal off-slide content.

17. The computer readable storage device of claim 11, wherein the object is an image.

18. The computer readable storage device of claim 11, wherein the object is an image and the input is touch.

19. A computer system, the computer system including a processor electronically coupled to a input device, an output device, and memory, the memory housing instructions that, upon execution, perform the following method:
    displaying a first editable workspace area of an application, wherein the editable workspace area includes a first editable item, the first editable item including an object that is selectable and de-selectable;
    determining that the object is selected;
    receiving input;
    determining to edit the object based on the object being selected;
    editing the object based on the received input;
    receiving input specifying that the object displayed in the first editable workspace area be deselected;
    in response to receiving the input specifying that the object displayed in the first editable workspace area be deselected, deselecting the object in the displayed first editable workspace area; and
    after deselecting the object, receiving a new input;
    based on the new input, advancing to a second editable workspace area of the application.

20. The computer system of claim 19, wherein the first editable item is a slide, a page, or a spreadsheet.

21. The computer system of claim 19, wherein the input is a touch.

22. The computer system of claim 21, wherein the touch input is indicative of an upward swipe, and further wherein the editing the selectable object includes moving up the selectable item based on the upward swipe.

23. The computer system of claim 21, wherein the received input is an upward swipe, and further comprising interacting with the first editable item by advancing from the first editable item to a second editable item such that the first editable item is no longer displayed.

24. The computer system of claim 20, wherein the application is a presentation application.

* * * * *